V. ANDERSEN.
SPRING AND SHOCK ABSORBER.
APPLICATION FILED MAY 29, 1913.

1,113,941.                                      Patented Oct. 20, 1914.

Witnesses:
Geo. Knutson
E. C. Skinkle

Inventor:
Victor Andersen
By his Attorneys:
Williamson Merchant

UNITED STATES PATENT OFFICE.

VICTOR ANDERSEN, OF DETROIT, MINNESOTA.

SPRING AND SHOCK-ABSORBER.

1,113,941.     Specification of Letters Patent.     Patented Oct. 20, 1914.

Application filed May 29, 1913. Serial No. 770,663.

*To all whom it may concern:*

Be it known that I, VICTOR ANDERSEN, a citizen of the United States, residing at Detroit, in the county of Becker and State of Minnesota, have invented certain new and useful Improvements in Springs and Shock-Absorbers; and I do hereby declare the following to be a full, clear, and exact description of the invention, such as will enable others skilled in the art to which it appertains to make and use the same.

My invention relates to improvements in vehicle springs and has for its object to increase the efficiency of the same and to provide means for absorbing or cushioning the recoil thereof.

As is well known, springs act more efficiently when carrying the full load for which they are designed than when carrying only a partial load.

My invention provides a main spring designed to carry the empty vehicle and a supplemental spring, coöperating with the main spring, to automatically increase the tension of the main spring for loads of different weight. This supplemental spring also acts as a shock absorber during the recoil of the main spring.

To the above ends, generally stated, the invention consists of the novel devices and combinations of devices hereinafter described and defined in the claims.

In the accompanying drawings, which illustrate the invention, like characters indicate like parts throughout the several views.

Figure 1:
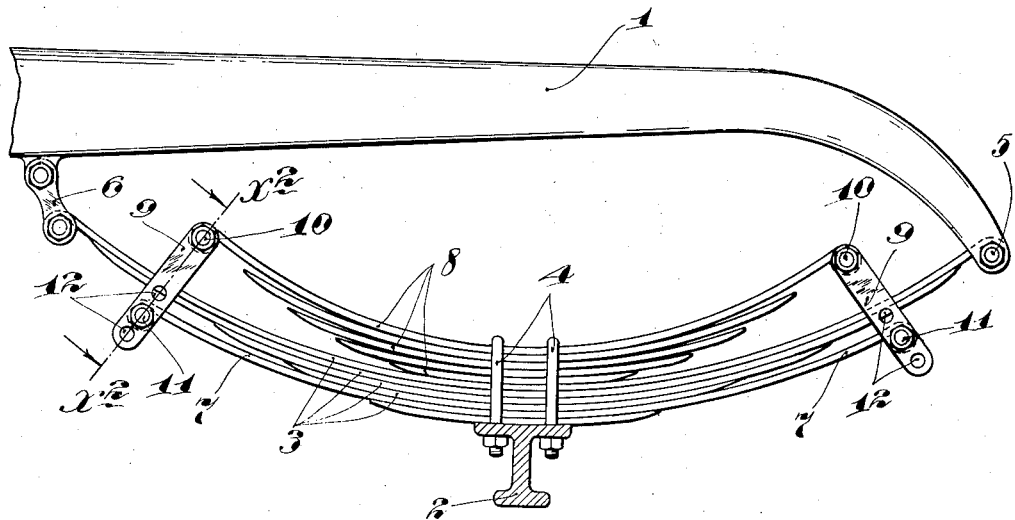
Figure 2:
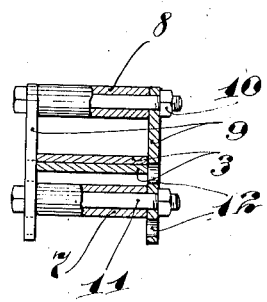

Referring to the drawings: Figure 1 is a view principally in side elevation showing my invention applied in working position to an automobile frame; and Fig. 2 is a view principally in section, taken on the line $x^2\ x^2$ of Fig. 1.

The numeral 1 indicates one of the side bars of the frame of an automobile body, and the numeral 2 indicates the front axle thereof. This side bar 1 is supported from the axle 2 by a main spring 3 comprising a plurality of leaves diminishing in length from the top to the bottom leaf. The intermediate portions of these leaves are secured to the axle 2 by a pair of nut equipped clips 4. The front end of the major leaf of the main spring is pivotally secured to the forwardly and downwardly curved end of the side bar 1 by a bolt 5, and the rear end thereof is pivotally secured to said bar by short links 6. Interposed in the main spring 3, between the two bottom leaves thereof, is an auxiliary leaf 7, greater in length than the two overlying leaves of the main spring.

Mounted on the main spring 3 is a supplemental spring 8, comprising a plurality of leaves diminishing in length in the same order as those of the main spring. The intermediate portions of the leaves of the supplemental spring 8 are secured together and to the main spring 3 by the clips 4. The leaves of the supplemental spring 8 gradually separate from their connected intermediate portions to their ends. Pairs of laterally spaced links 9 connect the ends of the major leaf of the supplemental spring 8 to the ends of the auxiliary leaf 7. Pivot bolts 10 connect the upper ends of said links 9 to the major leaf of said supplemental spring 8, and pivot bolts 11 connect the lower ends of said links to the ends of the auxiliary springs 7. The links 9 are provided with a plurality of pairs of longitudinally spaced perforations 12, through any one pair of which the pivot bolt 11 may be passed, to vary the distance between the pivot bolts 10 and 11, for adjusting the tension of the improved spring.

As previously stated, the main spring 3 is designed to carry the empty vehicle. When the vehicle is loaded, the links 9 will draw down the major leaf of the supplemental spring 8, to assist in carrying the load. As the load of the vehicle is increased, the remaining leaves of the supplemental spring 8 will be successively engaged and drawn downward, thereby gradually and automatically increasing the tension of the spring. Of course, the auxiliary leaf 7 will also assist in increasing the tension of the spring. In the recoil of the main spring, the leaves of the supplemental spring are successively engaged, in reverse order from that just described, and thereby gradually cushion the recoil of the main spring. If the rebound of the vehicle is more than sufficient to bring all of the leaves of the supplemental spring 8 into action, the links 9 will pick up the auxiliary leaf 7 and thereby further cushion the recoil. The auxiliary leaf will be brought into contact with the overlying leaves of the main spring 3, if the rebound is very great, thereby checking the recoil of the vehicle and avoiding any danger of breaking any of the leaves of the main spring.

It is, of course, understood, that the main and supplemental springs may be provided with any number of leaves, depending on the load for which they are designed. In some instances, it might be desirable to extend the ends of the auxiliary leaf 7 beyond the pivot bolts 11 and allow the same to rest loosely on said bolts, instead of securing the leaf thereto, as shown in the drawings.

One of the advantages of my invention is that the supplemental spring 8 may be applied to vehicles with ordinary leaf springs, not provided with my auxiliary leaf 7, in which case the pivot bolts 11 will directly engage and act upon the intermediate leaves of said springs.

The above described device has, in actual usage, been found highly efficient for making cars ride easy, doing away with the greater part of the rebounding of the back seat after the wheels of the car have struck a hole in the road. It also prevents the side swing of the front wheels in leaving a hole in the road.

What I claim is:

1. The combination with a main spring, of a supplemental spring comprising a plurality of leaves separated at their ends, means connecting the ends of one of the leaves of said supplemental spring to said main spring, whereby the leaves of said supplemental spring will be successively brought together in the direction of the tension on said main spring, under increased load, and whereby the leaves of said supplemental spring will be successively brought together in reverse order, under the action of the recoil of said main spring.

2. The combination with a main spring, of a supplemental spring comprising a plurality of leaves separated at their ends and varying in length from the outer to the inner, and means connecting the ends of the major leaf of said supplemental spring to said main spring, whereby the leaves of said supplemental spring will be successively brought together from the major to the minor leaf, under increased load, and whereby the leaves of said supplemental spring will be brought together in reverse order, under the action of the recoil of said main spring.

3. The combination with main and supplemental springs mounted one upon the other and comprising a plurality of leaves, the leaves of both springs varying in length in the same direction, the leaves of said supplemental spring being separated at their ends, and adjustable means connecting the major leaf of said supplemental spring with one of the lesser leaves of said main spring.

4. The combination with main and supplemental springs mounted one upon the other and comprising a plurality of leaves, the leaves of said supplemental spring being separated at their ends, the leaves of both springs varying in length in the same direction, of an auxiliary leaf forming a part of said main spring and of a length greater than the minor leaf thereof, and adjustable means connecting the major leaf of said supplemental spring with said auxiliary leaf.

In testimony whereof I affix my signature in presence of two witnesses.

VICTOR ANDERSEN.

Witnesses:
 N. L. CABANNE,
 S. R. SPEINE.